United States Patent [19]

Luechinger

[11] Patent Number: 5,285,021
[45] Date of Patent: Feb. 8, 1994

[54] WEIGHING APPARATUS INCLUDING SIDE WALL OPERATION MEANS

[75] Inventor: Paul Luechinger, Uster, Switzerland

[73] Assignee: Mettler-Toledo AG, Greifensee, Switzerland

[21] Appl. No.: 978,387

[22] Filed: Nov. 18, 1992

[30] Foreign Application Priority Data

Dec. 17, 1991 [CH] Switzerland .................. 3733/91

[51] Int. Cl.⁵ .......................................... G01G 21/30
[52] U.S. Cl. ..................................... 177/181; 177/239
[58] Field of Search ..................... 177/180, 181, 239

[56] References Cited

U.S. PATENT DOCUMENTS

| | | | |
|---|---|---|---|
| 4,465,152 | 8/1984 | Schmitter | 177/180 |
| 4,664,207 | 5/1987 | Knothe et al. | 177/181 |
| 4,700,793 | 10/1987 | Lüchinger | 177/181 |
| 4,798,250 | 1/1989 | Knothe et al. | 177/181 |
| 5,058,692 | 10/1991 | Melcher et al. | 177/181 |
| 5,152,356 | 10/1992 | Strickler et al. | 177/180 |
| 5,170,855 | 12/1992 | Kunz et al. | 177/181 |

FOREIGN PATENT DOCUMENTS 8803709  3/1988  Fed. Rep. of Germany .

Primary Examiner—George H. Miller, Jr.
Attorney, Agent, or Firm—Laubscher & Laubscher

[57] ABSTRACT

Weighing apparatus of the windscreen type including a housing having a pair of vertical side walls that are movable between opened and closed positions relative to the housing, thereby to afford access to a weighing pan contained within the housing weighing chamber, characterized by the provision of a lever arrangement for opening either or both of the side walls. A pair of operating levers (77,79) arranged generally end-to-end transversely beneath the housing extend at their remote ends beyond opposite sides of the housing for selective connection with the associated side wall, respectively, the adjacent ends of the levers being movably connected with the housing, the levers also being connected with each other by a coupling plate (89) that is slidably connected for displacement forwardly and rearwardly of the housing. The levers and the coupling plate are formed from sheet metal, whereby the total height of the lever arrangement is kept to a minimum without substantially changing the vertical dimensions of the weighing apparatus.

11 Claims, 5 Drawing Sheets

WEIGHING APPARATUS INCLUDING SIDE WALL OPERATION MEANS

REFERENCE TO RELATED APPLICATION

This is a companion application of U.S. application Ser. No. 964,017 filed Oct. 21, 1992 by Paul Luechinger and Eduard Fringeli entitled "Weighing Apparatus Having Improved Windscreen Means" [Our Case No. 18056].

STATEMENT OF THE INVENTION

A weighing apparatus of the type including a windscreen is provided having lever operating means arranged below the housing bottom wall to selectively open either or both of the housing side walls.

BRIEF DESCRIPTION OF THE PRIOR ART

In order to prevent measurement errors due to ambient air movement in the laboratory during a weighing operation, it has been proposed to provide a windscreen around the weighing pan, which windscreen must be opened in order to apply to the weighing pan the material to be weighed. Such a precision weighing apparatus of the windscreen type is shown, for example, by the U.S. Pat. to Luechinger No. 4,700,793. In this prior art weighing scale, the windscreen includes a stationary front panel, a pair of side walls that are shiftable to the rear along a linear track, together with a top wall that is also shifted to the rear. The rear wall of the weighing chamber is formed by the scale housing. Underneath the bottom wall of the housing, there are provided operating means which are also linearly displaceable to the rear, which operating means are connected with the side walls, whereby the side walls are simultaneously displaced to the rear by the operating means.

By means of a second operating member, the cover member moreover can be also shifted to the rear with the side walls, or with only one of the side walls. Handles are provided on both sides of the shifting means so that the scale operator can, as desired, open either the left hand or the right hand side wall of the housing. It is thus possible for the user to open or close the right side wall by means of the user's left hand on the left side of the weighing apparatus. This known weighing apparatus has proven to be suitable for scales having a rectangular scale housing whose side walls may be shifted linearly forwardly and rearwardly of the housing.

It has also been proposed in the weighing scale art to provide windscreen devices having generally cylindrically bent side walls arranged for movement along circular tracks. It is not possible to use the previously proposed operating means in connection with this latter type of weighing apparatus.

SUMMARY OF THE INVENTION

A primary object of the present invention is to provide a weighing apparatus of the windscreen type including a housing having a pair of movable opposed side walls partially defining a weighing chamber, and operating lever means arranged beneath the housing bottom wall for selectively displacing either or both of the side walls relative to the housing along an arcuate path between chamber-closed and chamber-open positions.

According to a more specific object of the invention, a pair of operating levers is arranged in end-to-end relation transversely beneath the bottom wall of the housing, the levers being movably connected at their adjacent ends with the housing bottom wall, said levers extending at their remote ends beyond the side edges of the bottom wall for selective connection with the housing side walls, respectively. The levers are also connected with each other by a coupling plate connected for front-to-rear sliding movement beneath the housing bottom wall. By the appropriate selective connection of the side walls with the lever remote ends, respectively, either or both of the side walls may be operated between the open or closed positions relative to the housing.

A more specific object of the invention is to provide an operating lever arrangement in which the levers and the coupling plate are formed from relatively thin sheet metal, thereby to reduce the height of the apparatus to a minimum. For simplicity and economy, the levers are of identical construction and are operable on opposite sides of the center line of the apparatus. Sliding blocks or rollers extend from the levers into transverse slots contained in the coupling plate to transfer the swinging motion of the levers to axial displacement of the coupling plate forwardly and rearwardly of the housing. By proper selection of the material from which the sliding member is formed, and/or by proper arrangement of the parts, a low-friction connection between the components is achieved for ease of shifting of the side walls between their closed and open positions. Through the use of guide roller means, guidance of the components in a relatively noiseless play-free manner may be achieved. Furthermore, according to another feature of the invention, guide rails are provided that extend within peripheral grooves contained in the circumference of the rollers, thereby to firmly hold the components together in a flat arrangement that is easily mounted beneath the scale housing. Vertically displaceable pins on the side walls selectively cooperate with corresponding bores contained in the levers, respectively, thereby to permit selective operation of either or both of the side walls. The pins may be spring-loaded for operation between their engaged and disengaged positions, respectively.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
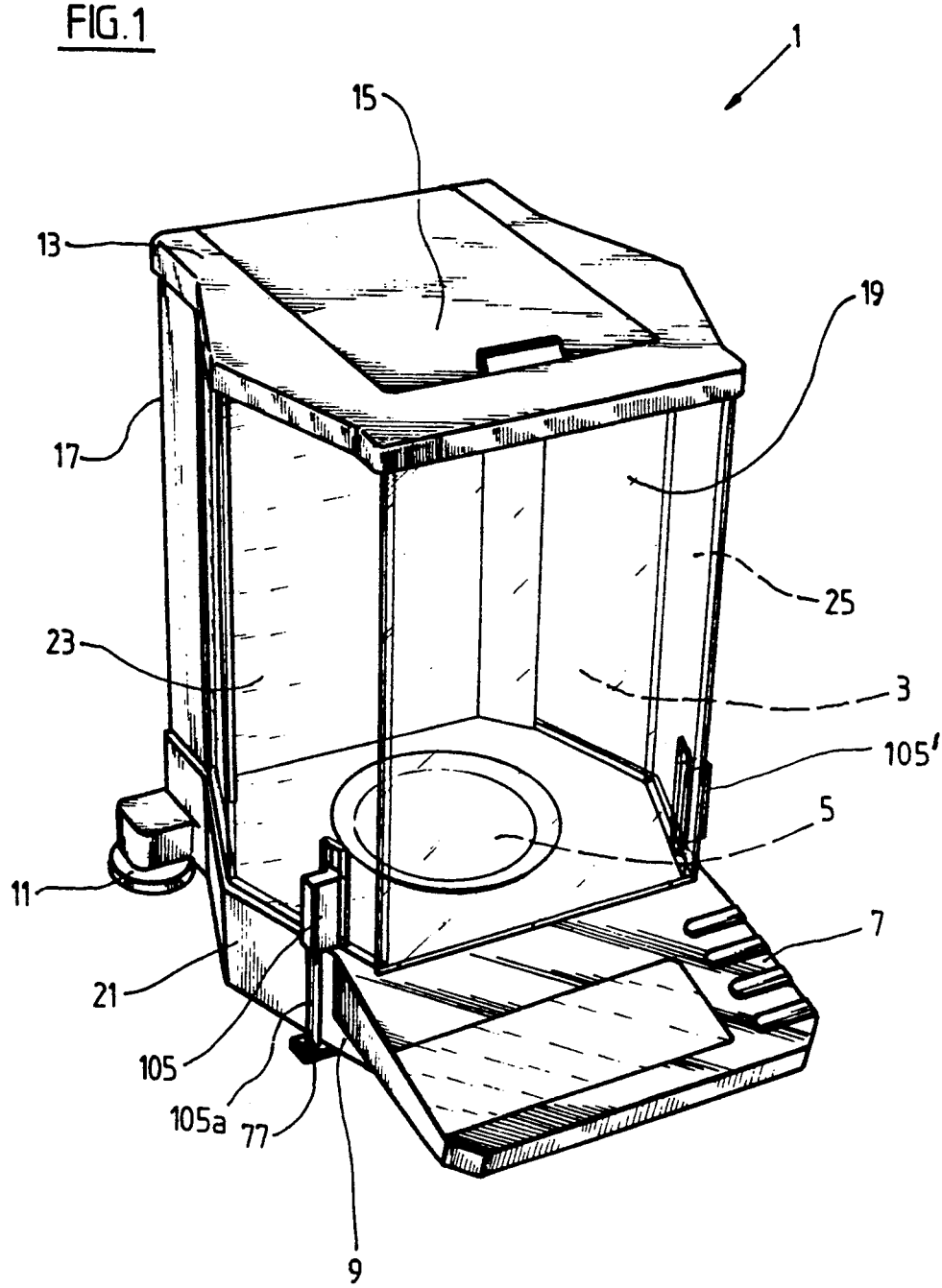
FIG. 1 is a front perspective view of the weighing apparatus of the present invention.

Referring first more particularly to FIG. 1, the weighing apparatus of the present invention is of the windscreen type including a housing 1 having a weighing chamber 3 containing a weighing pan 5 that is connected for movement relative to the housing base portion 9. As is known in the art, keyboard means 7 having a visual display are mounted at the forward portion of the base, the electronic and mechanical components of the scale being mounted within the base portion of the housing. The housing is supported by three adjustable levelling support feet 11, only one of which is shown. The housing includes a stationary planar transparent front wall 19, a rear wall 17, a bottom wall 21, and a top wall 13 containing a lid portion 15 that may be opened upwardly about a horizontal rear pivot axis. As disclosed in greater detail in the companion Luechinger et al U.S. application Ser. No. 964,017 filed Oct. 21, 1992, the side walls 23 and 25 are movably connected with the housing for sliding movement between their illustrated closed positions along arcuate tracks toward a rearward position (not shown), thereby to open either the left-hand or right-hand sides of the weighing chamber, or both sides simultaneously, whereby material may be added to or removed from the weighing pan 5. As shown in FIGS. 2-5, the side walls 23 and 25 are movable along a generally arcuate path P.

Figure 2:
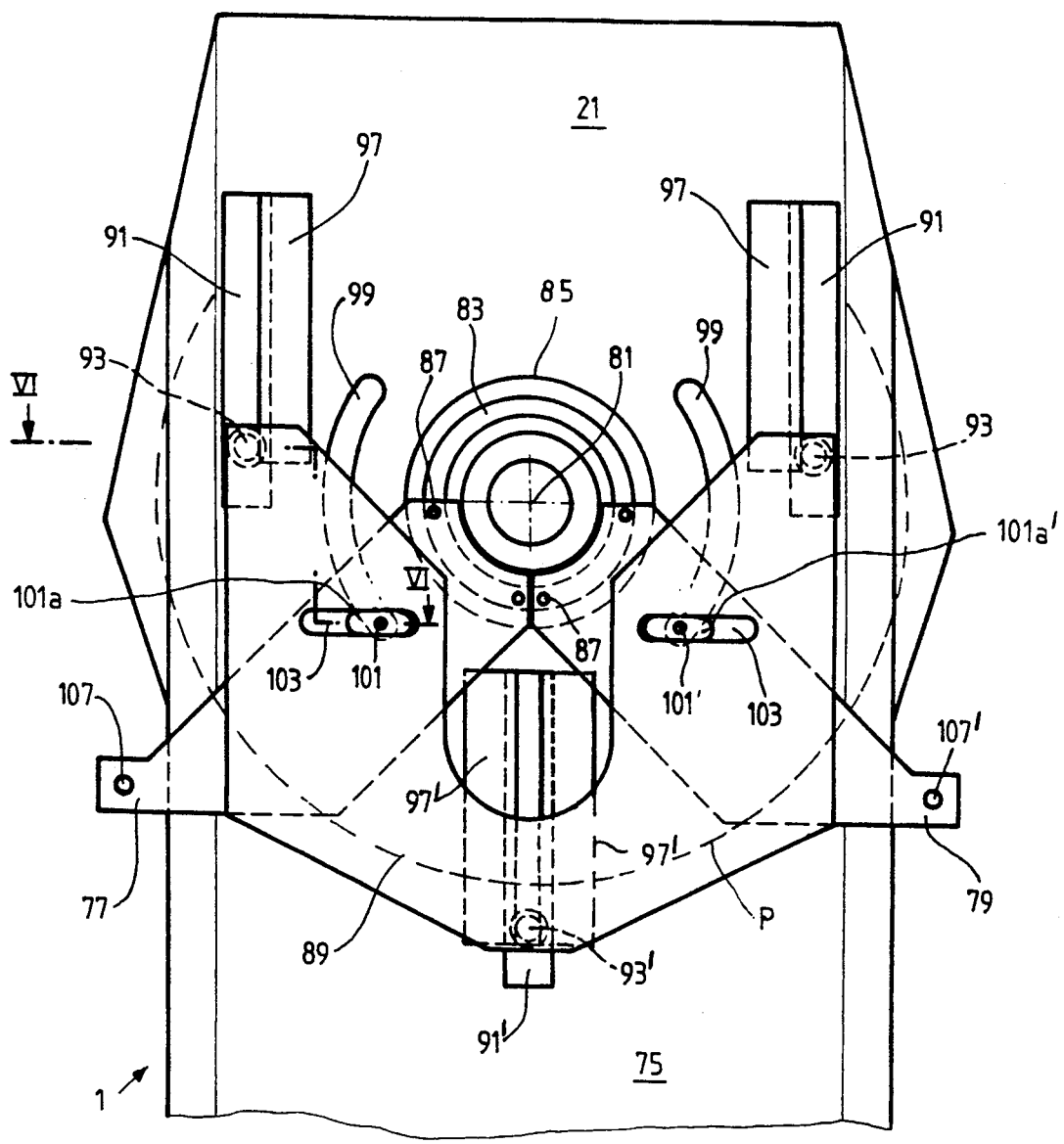
FIGS. 2–4 are bottom views of the weighing apparatus of FIG. 1 with the operating lever means in the open, intermediate, and closed positions, respectively.

In accordance with a primary feature of the present invention, a pair of operating levers 77 and 79 are mounted beneath the housing bottom wall 21 for selectively operating the movable side walls 23 and 25. Referring more particularly now to FIG. 2, the operating levers are mounted for swinging movement about a vertical central pivot axis 81. More particularly, the bottom wall of the housing contains a sleeve member 85 which, as more particularly shown in FIGS. 2 and 5, contains a circular cam groove 83 that receives a pair of cam members 87 arranged on the adjacent ends of each of the levers 77 and 79. Thus, the adjacent ends of the levers are guided for circular travel along groove 83 concentrically about the central pivot axis 81. At their remote ends, the levers 77 and 79 project outwardly beyond the side edges of the bottom wall 21, thereby to define protruding portions containing bores 107, 107' for selectively receiving connecting pins 105a (FIG. 1) of the vertically shiftable side wall connecting means 105, 105'. Thus, side wall 23 may be selectively connected with lever 77 by pin 105a of connecting means 105, and lever 79 may be selectively connected with side wall 25 by connecting means 105' having a corresponding connecting pin (not shown) that is adapted to engage opening 107' contained in actuating lever 79.

Figure 6:
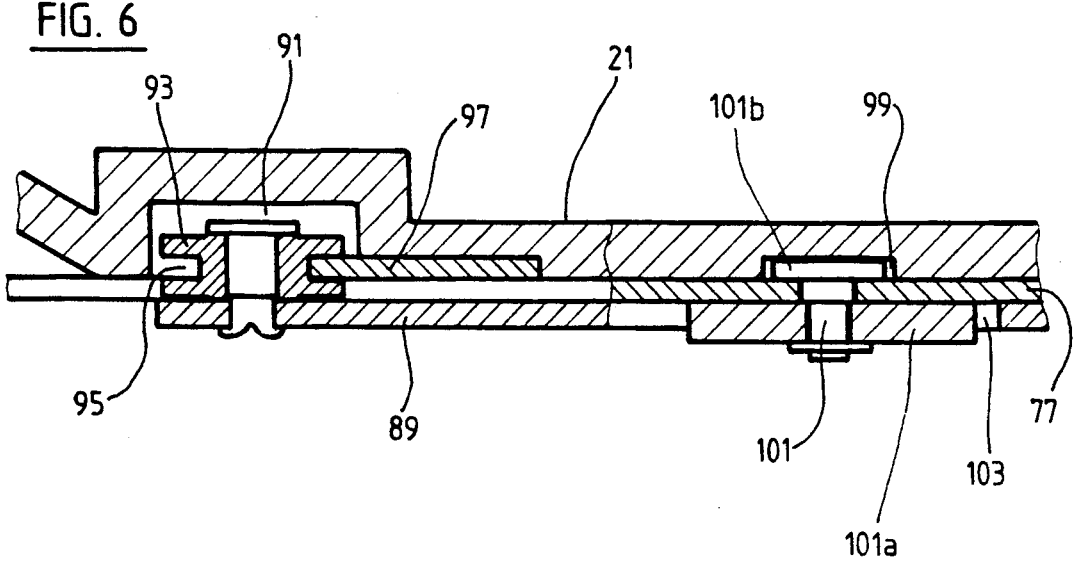
FIG. 6 is a detailed sectional view taken along line VI—VI of FIG. 2.

The levers 77 and 79 are connected with each other by a coupling plate 89 that is mounted for sliding movement beneath and parallel with the bottom wall 21. More particularly, the coupling plate 89 is provided with a plurality of guide rollers 93 that extend within corresponding guide grooves 91 contained in the bottom wall 21. The guide grooves 91 are parallel and extend forwardly and rearwardly of the housing 1. As shown in FIG. 6, the guide rollers 93 contain circumferential grooves 95 that receive parallel guide rails 97 that are secured to the housing bottom wall 21 and extend partially laterally within the guide grooves 91, respectively. In the case of the central guide groove 91', a pair of guide rails 97' are provided that extend laterally within opposite sides of the groove 91', thereby to engage diametrically opposite portions of the circumferential groove 95' contained in the center guide roller 93'. In order to connect the levers with the coupling plate 89, the levers are provided with coupling means 101 which, in the embodiment of FIG. 6, include slide blocks 101a that slidably extend within corresponding transverse slots 103 contained in the coupling plate 89. The coupling means extends through corresponding openings contained in the levers and include at their other ends slide members 101b that extend within corresponding arcuate grooves 99 contained in the bottom wall 21. If desired, rollers could be substituted for the slide blocks.

Operation

Figure 3:
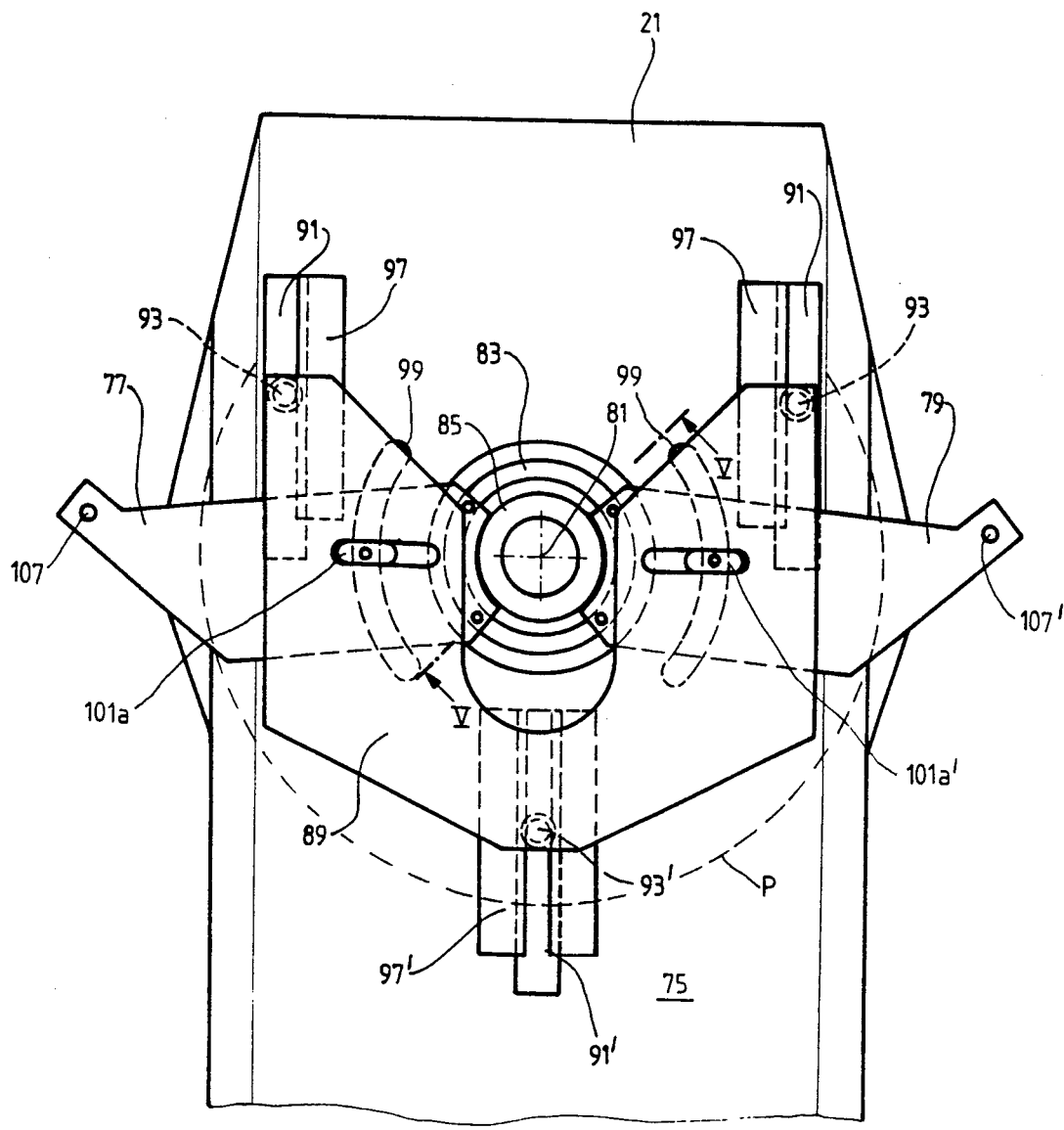
Figure 4:
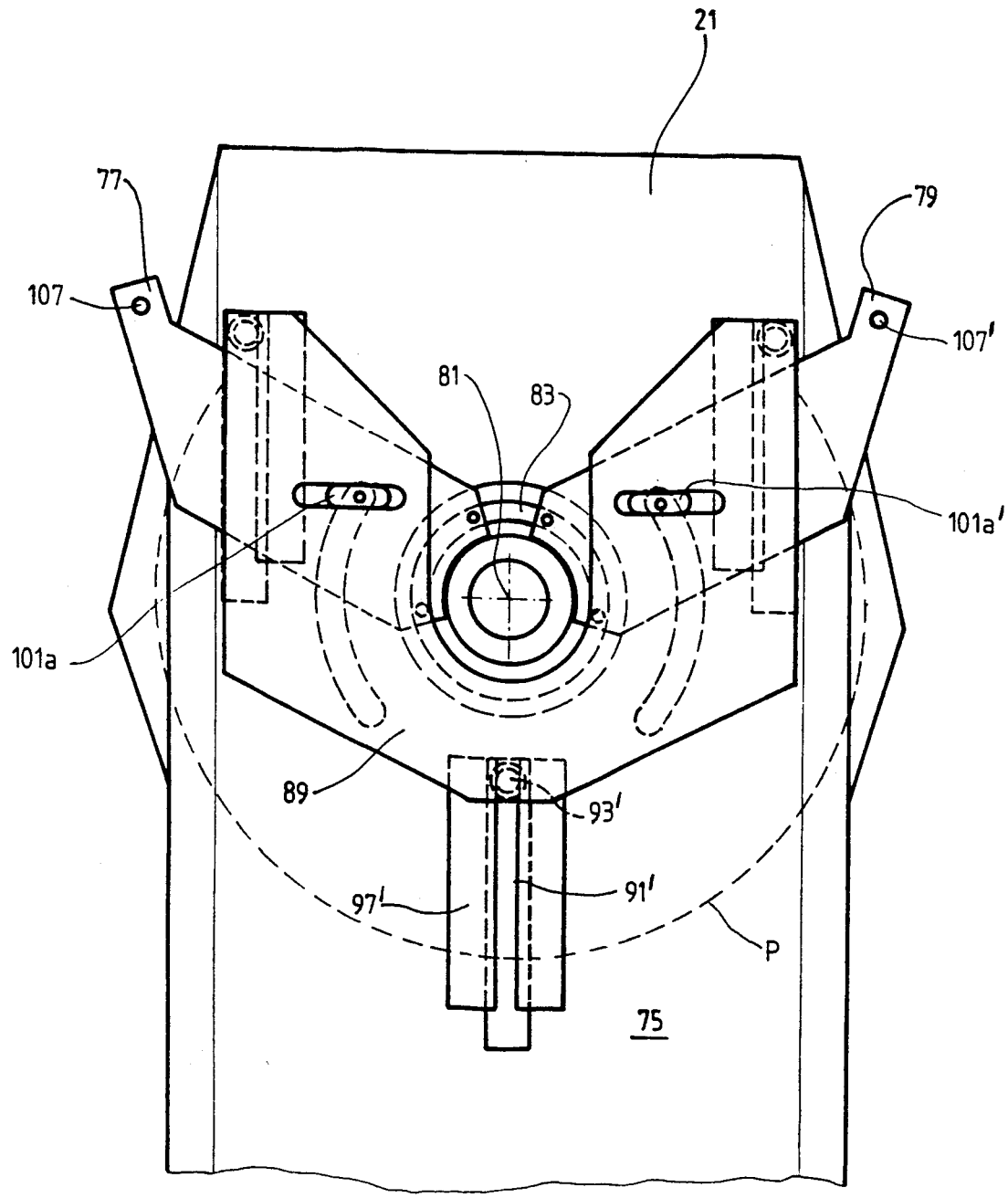
Figure 5:
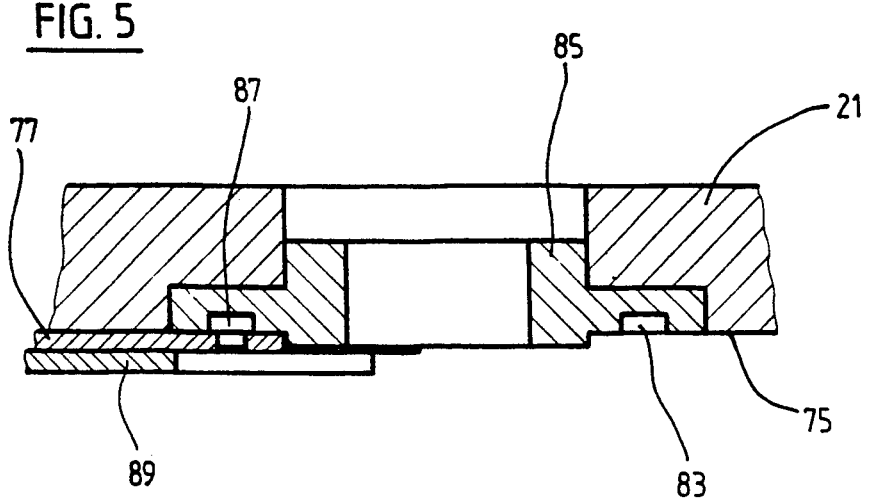
FIG. 5 is a detailed sectional view taken along line V—V of FIG. 3.

In operation, assume that the operating levers 77 and 79 are in the forward closed positions illustrated in FIGS. 1 and 4. Assume also that each of the side walls is connected with the operating lever assembly by means of the pins 105a and 105a' cooperating with the bores 107 and 107' of the levers 77 and 79, respectively. Thus, when either of the levers 77 or 79 is displaced in the rearward direction by the operator, the coupling plate 89 is progressively shifted rearwardly from the position of FIG. 4 to the position of FIG. 3, thereby to likewise displace the other lever in the rearward direction and the side walls 23 and 25 are both displaced rearwardly along the arcuate path P toward the rear wall 17 of the housing. Owing to the cooperation between the arcuate grooves 99 and the slide member portions 101b, the slide blocks 101a are displaced radially outwardly in the slots 103 relative to the central axis 81, as shown in FIG. 3. Upon further movement of the levers 77 and 79 toward the rearmost position shown in FIG. 2, the side walls are moved further in the rearward direction along the arcuate path P.

In order to close the side walls 23 and 25, either of the levers 77 or 79 is pivoted forwardly toward the position illustrated in FIG. 4, and owing to the connection afforded by the coupling plate 89, the other lever is similarly displaced forwardly to the FIG. 4 position.

Thus, either lever may be operated to effect opening operation of either of the side walls that is connected at that time. Thus, if it were to be desired to open only one of the side walls (i.e., sidewall 25), the other side wall would be disconnected from the associated lever by appropriate operation of the side wall connecting means 105 (for example, by disconnecting pin 105a from bore hole 107 contained in operating lever 77). If desired, the operating means 105 may be of the dual operating force actuation type illustrated by the conventional retractable ballpoint pen mechanism.

The invention affords the advantage that the operating lever arrangement is located directly beneath the bottom wall of the housing at an accessible location for lubrication and/or cleaning. To disconnect the components, it is merely necessary to disconnect the guide rails 97, whereby the coupling plate 89 and the levers 77 and 79 may be readily separated from the apparatus. The slide blocks 101a may be connected to the pillars 101 by conventional C-clips or Seeger clips.

The entire structural height of the side wall operating means consists essentially of the sum of the widths of the sheet metal layers from which the levers 77 and 79 and coupling plate 89 are formed.

While in accordance with the provisions of the Patent Statutes the preferred forms and embodiments of the invention have been illustrated and described, it will be apparent that various modifications may be made without deviating from the inventive concepts set forth above. For example, the connecting concept between the side walls and the levers could be reversed (i.e., with the connecting means being mounted on the levers instead of at the side walls). Further, the movement of the levers need not be circular. Other arcuate paths (e.g., elliptical paths) are likewise feasible, corresponding to the chosen form of path P of the movable side walls.

What is claimed is:

1. In a weighing apparatus of the windscreen type including a housing (1) having stationary vertical front (19) and rear (17) walls, stationary horizontal bottom (21) and top (13) walls, and a pair of movable side walls (23,25) cooperating with the other housing walls to define a weighing chamber (3) containing a weighing pan (5) that is connected for movement relative to said bottom wall, each of said side walls being connected with said housing for movement along a horizontal arcuate path (P) between chamber-open and chamber closed positions, respectively, relative to said housing, the improvement which comprises: means arranged beneath said bottom wall for shifting at least one of said side walls between said closed and open positions, said shifting means including:
   (a) a pair of operating flat levers (77, 79) arranged generally end-to-end beneath and parallel with said bottom wall;
   (b) lever connecting means connecting said levers at their adjacent one ends for movement relative to said bottom wall, said levers extending at their remote other ends outwardly beyond the opposed side edges of said bottom wall, respectively;
   (c) coupling means connecting said levers for simultaneous movement relative to each other, said coupling means including a flat coupling plate (89) arranged below and parallel with said bottom wall; and
   (d) side wall connecting means (105,107) connecting at least one of said movable side walls with the adjacent lever, respectively.

2. Apparatus as defined in claim 1, wherein said coupling means further includes guide means (91) guiding said coupling plate for linear movement forwardly and rearwardly of said housing.

3. Apparatus as defined in claim 2, wherein said guide means comprises at least two guide grooves (91) contained in said bottom wall, respectively, said guide grooves extending generally forwardly and rearwardly relative to said housing, and a plurality of guide members (93) connected with said coupling plate and extending in guided relation within said guide grooves.

4. Apparatus as defined in claim 3, wherein said guide members (93) comprise guide rollers each containing a continuous circumferential groove (95), and further wherein said guide means further includes a plurality of guide rails (97) connected with said bottom wall adjacent said guide grooves, respectively, said guide rails including parallel linear edge portions that extend within the circumferential groove contained in the associated guide roller, respectively.

5. Apparatus as defined in claim 2, wherein said coupling means includes a pair of slide means (101) connected with, and extending normal to, said levers, respectively, each of said slide means including a first end portion (101a) slidably mounted in a slot (103) contained in said coupling plate, said slot extending in a direction normal to said side walls.

6. Apparatus as defined in claim 5, wherein each of said slide means extends through an opening contained in the lever and includes at its other end a second end portion (101b) slidably mounted in an arcuate groove (99) contained in the adjacent face (75) of said housing bottom wall, said arcuate grooves being generated about a common central axis (81) contained between the adjacent ends of said levers.

7. Apparatus as defined in claim 1, wherein said lever connecting means for connecting each of said levers with said housing bottom wall includes at least one cam member (87) connected at one end with said lever one end, said housing bottom wall containing a circular cam track (83) into which said cam members extend.

8. Apparatus as defined in claim 1, wherein said side wall connecting means are operable to selectively connect each of the side walls with the associated lever, respectively.

9. Apparatus as defined in claim 8, wherein each of said side wall connecting means includes a vertical pin (105a) slidably connected with said side wall for displacement between operable and inoperable positions relative to the associated lever, said pin in the operable position extending at one end within a corresponding bore (107) contained in said other end of said lever.

10. Apparatus as defined in claim 1, wherein said levers are arranged intermediate said coupling plate and said bottom wall, whereby said coupling plate at least partially supports said levers.

11. Apparatus as defined in claim 10, wherein said levers and said coupling plate are formed of sheet metal, whereby the height of the housing may be reduced to a minimum.

* * * * *